(12) United States Patent
Conley et al.

(10) Patent No.: US 7,998,885 B2
(45) Date of Patent: Aug. 16, 2011

(54) FINE-FIBER NONWOVEN-SUPPORTED COATING STRUCTURE

(75) Inventors: Jill A. Conley, Midlothian, VA (US); George Bruce Palmer, IV, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 275 days.

(21) Appl. No.: 12/215,767

(22) Filed: Jun. 30, 2008

(65) Prior Publication Data

US 2009/0324925 A1 Dec. 31, 2009

(51) Int. Cl.
*B32B 5/18* (2006.01)
*B32B 5/22* (2006.01)
*B31B 1/60* (2006.01)

(52) U.S. Cl. ............ 442/76; 442/85; 442/118; 442/168; 442/394; 219/219; 219/357; 219/364; 219/365; 219/401; 156/60

(58) Field of Classification Search ............. 442/76, 442/85, 118, 394, 168, 340; 428/219, 357, 428/364, 365, 401; 156/60
See application file for complete search history.

(56) References Cited

U.S. PATENT DOCUMENTS

| 3,329,557 | A | 7/1967 | Magat et al. | |
|---|---|---|---|---|
| 3,374,288 | A | 3/1968 | Lange | |
| 3,966,835 | A | 6/1976 | Christoph et al. | |
| 4,127,706 | A | 11/1978 | Martin et al. | |
| 5,364,582 | A | 11/1994 | Lilly | |
| 7,307,031 | B2 * | 12/2007 | Carroll et al. .................. | 442/76 |
| 2004/0116025 | A1 * | 6/2004 | Gogins et al. ................ | 442/340 |
| 2004/0116028 | A1 * | 6/2004 | Bryner ........................ | 442/381 |
| 2005/0008776 | A1 * | 1/2005 | Chhabra et al. .............. | 427/180 |
| 2008/1001047 | | 1/2008 | Harris | |
| 2008/0220676 | A1 * | 9/2008 | Marin et al. ................... | 442/76 |

FOREIGN PATENT DOCUMENTS

WO  WO 03/080905 A1  10/2003

* cited by examiner

*Primary Examiner* — Norca L Torres Velazquez

(57) ABSTRACT

This invention relates to a liquid penetration-resistant water-vapor-permeable multi-layer composite material and process for making the same comprising a porous nanofiber web of polymeric fibers, wherein the polymeric fibers of the nanofiber web have a diameter of less than 1000 nanometers and wherein the nanofiber web has a basis weight of 5 to 40 grams per square meter and a surface roughness (ΔRMS) of 5 to 15 micrometers and where, the porous nanofiber web is coated on a surface with a layer of water-vapor-permeable, hydrophilic, monolithic, water transport material.

17 Claims, No Drawings

FINE-FIBER NONWOVEN-SUPPORTED COATING STRUCTURE

BACKGROUND OF THE INVENTION

1. Field of the Invention

The present invention is directed to a liquid-penetration-resistant water-vapor-permeable material.

2. Description of the Related Art

Many fabric structures currently available that are considered waterproof-breathable achieve this designation through the use of a liquid-impermeable, moisture-vapor-permeable coating. This coating typically has a much lower moisture vapor transmission rate (MVTR) than the fabric to which it is mated and therefore reduces the comfort level of the final structure by not allowing the moisture from the inside of the garment and/or fabric structure to pass through to the outside at a rate that is comfortable to the user.

These coatings vary in structure and include hydrophobic, hydrophilic, direct coated, transfer coated, microporous, monolithic, ceramic containing, and others.

While it is known in the prior art to form water-penetration-resistant water-vapor permeable multi-layer composites, a need is present to increase the rate of water vapor transmission in these composites.

SUMMARY OF THE INVENTION

In a first embodiment, the present invention is directed to a liquid penetration-resistant water-vapor-permeable multi-layer composite material comprising a porous nanofiber web of polymeric fibers, wherein the polymeric fibers of the nanofiber web have a diameter of less than 1000 nanometers and where the nanofiber web has a basis weight of 5 to 40 grams per square meter and a surface roughness (ΔRMS) of 5 to 15 micrometers, where, the porous nanofiber web has an upper surface and a lower surface, and a water-vapor-permeable, hydrophilic, monolithic, water transport layer, and where, the porous nanofiber web is coated on the upper surface with a 5 to 15 micrometers layer of said water-vapor-permeable, hydrophilic, monolithic, water transport layer.

In a further embodiment, a method of forming a liquid-penetration-resistant water-vapor-permeable multi-layer composite material is disclosed comprising the steps of forming a layer of porous nanofiber web of polymeric fibers, wherein the polymeric fibers of the nanofiber web have a diameter of less than 1000 nanometers and wherein the nanofiber web has a basis weight of 5 to 40 grams per square meter and, where the porous nanofiber web has a surface roughness (ΔRMS) of 5 to 15 micrometers, and where said porous nanofiber web has an upper surface and a lower surface, and forming a water-vapor-permeable, hydrophilic, monolithic, water transport layer, and applying said water-vapor-permeable, hydrophilic, monolithic, water transport layer of the upper surface of said nanofiber web.

DETAILED DESCRIPTION OF THE INVENTION

The material of the present invention comprises a composite web, made from a nanofiber web of one or more nanofiber layers in combination with a water-vapor-permeable, hydrophilic, monolithic, water transport layer which is a thin coating of a polymer. This combination can be made by adhesively laminating the nanofiber web to the water transport layer (which includes deposition of a self-adhesive coating onto the nanofiber web with or without curing), or by forming the nanofiber layer directly on the water transport layer during the nanoweb spinning process to form a water transport layer/nanofiber layer structure. The nanofiber layer can also be adhered to the water transport layer by mechanical entanglement.

In reference to the invention, the following terms are described as set forth below:

The term "outer" when used to describe the location of a layer refers to the face of the garment that faces away form the wearer. The term "inner" refers to the user facing side of the garment.

The terms "nanofiber layer" and "nanoweb" are used interchangeably herein. A nanoweb is a nonowoven that comprise nanofibers.

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

By "garment" is meant any item that is worn by the user to protect some region of the user's body from weather or other factors in the environment outside the body. For example coats, jackets, pants, hats, gloves, shoes, socks, and shirts would all be considered garments under this definition.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials.

"Calendering" is the process of passing a web through a nip between two rolls. The rolls may be in contact with each other, or there may be a fixed or variable gap between the roll surfaces. An "unpafterned" roll is one which has a smooth surface within the capability of the process used to manufacture them. There are no points or patterns to deliberately produce a pattern on the web as it passed through the nip, unlike a point bonding roll.

Nanofiber Webs

The as-spun nanoweb comprises primarily or exclusively nanofibers, advantageously produced by electrospinning, such as classical electrospinning or electroblowing, and in certain circumstances, by melt blowing, or other such suitable processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

A substrate or scrim can be arranged on the collector to collect and combine the nanofiber web spun on the substrate. Examples of the substrate may include various nonwoven cloths, such as melt blown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers, and mixtures thereof. Preferred materials that fall within these generic classes include, poly (vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6,6, nylon 6,6-6,10, and the like. When the polymer nanowebs of the invention are formed by melt blowing, any thermoplastic polymer capable of being melt blown into nanofibers can be used, including polyolefins, such as polyethylene, polypropylene and polybutylene, polyesters such as poly(ethylene terephthalate) and polyamides, such as the nylon polymers listed above.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The *Handbook of Plasticizers*, edited by George Wypych, 2004 Chemtec Publishing, incorporated herein by reference, discloses other polymer/plasticizer combinations which can be used in the present invention.

The as-spun nanoweb of the present invention can be calendered in order to impart the desired physical properties to the fabric of the invention, as disclosed in co-pending U.S. Patent Publication No. 2008/007046, published Mar. 20, 2008 and incorporated herein by reference in its entirety. The as-spun nanoweb can be fed into the nip between two unpatterned rolls in which one roll is an unpatterned soft roll and one roll is an unpatterned hard roll, and the temperature of the hard roll is maintained at a temperature that is between the $T_g$, herein defined as the temperature at which the polymer undergoes a transition from glassy to rubbery state, and the $T_{om}$, herein defined as the temperature of the onset of melting of the polymer, such that the nanofibers of the nanoweb are at a plasticized state when passing through the calendar nip. The composition and hardness of the rolls can be varied to yield the desired end use properties of the fabric. One roll can be a hard metal, such as stainless steel, and the other a soft-metal or polymer-coated roll or a composite roll having a hardness less than Rockwell B 70. The residence time of the web in the nip between the two rolls is controlled by the line speed of the web, preferably between about 1 m/min and about 50 m/min, and the footprint or contact area between the two rolls. The footprint or contact area is the area that the web travels in contact with both rolls simultaneously. The footprint or contact area is controlled by the pressure exerted at the nip between the two rolls. The pressure can be measured in force per linear CD (cross direction) dimension of the roll, or by calculating the force per unit area of the footprint. Force per linear distance is calculated by dividing the force applied on the rolls by the linear distance the material makes contact on the rolls. Commonly used units for this calculation are Lb (f)/in or Kg (f)/cm. The force per unit area of the contact area can be calculated by dividing the force applied on the rolls by the footprint or contact area in the nip. Common units used are Lb $(f)/in^2$ or Kg $(f)/cm^2$. The contact area in the machine direction is between about 1 mm and about 30 mm. Further, the nonwoven web can be stretched, optionally while being heated to a temperature that is between the $T_g$ and the lowest $T_{om}$ of the nanofiber polymer. The stretching can take place either before and/or after the web is fed to the calendar rolls and in either or both the machine direction or cross direction.

The nanoweb can further comprise an antistatic agent. For example it is known that anti-static polyamide-based shaped articles such as fibers or filaments can be obtained by adding as an agent a poly-(alkylene ether)-glycol either to the condensation mixture or to the molten polyamide (see for example, U.S. Pat. Nos. 3,329,557, 3,374,288, and 3,966,835 all incorporated herein by reference in their entirety). Conventional antistatic products are fabricated by adding as antistatic agent conductive fillers like carbon black, conductive metal fiber, metal powder, or china powder to enhance their effective antistatic properties. The products described above have the advantages of being low-cost and having high-conductivity and are also suitable for use in the present invention.

Another method for manufacturing a modified antistatic high molecular weight fiber and woven is disclosed in U.S. Pat. No. 5,364,582, wherein 0.8 to about 2.5% by weight of low molecular weight amino-olefin is added as an antistatic agent to enhance the antistatic property, ultraviolet light resistance, dyeing ability and uptake properties of dyes. One skilled in the art will recognize further antistatic agents that can be used in the present invention.

The nanoweb can be further treated with a compound to render the surface thereof oleophobic or hydrophobic. One skilled in the art will know of appropriate compounds. Examples of such treatments are Zonyl fluorinated surfactant, available from DuPont, as described in commonly assigned U.S. Patent Publication No. 2008/010473, published May 8, 2008 hereby incorporated in its entirety by reference.

Surface Roughness Measurements

Although there are a plurality of methods to describe the roughness of a surface, the most common measurements generate a two dimensional representation of the surface expressed as a profile height (y) as a function of scan direction (x). From this information one or more of a number of surface profile parameters can be calculated. Rq is a statistical analysis which represents the average of the square of the deviations of the profile from the mean line (i.e., the standard deviation of the profile deviations). Rq is also often referred to RMS or ΔRMS where RMS is defined as the root-mean-square. In the present invention the surface roughness is expressed as ΔRMS and it will be used as the preferred measure used for surface roughness. Surface roughness is the measurement of the unevenness of a solid surface composed of pits and projections (peaks and valleys). The surface roughness of the exterior surface of the nanofiber web may be measured by the analysis of data obtained through optical interferometry. ΔRMS is also defined by ISO 4287 and DIN 4762. In the present invention, the surface roughness or ΔRMS, is a statistical analysis that represents an average of the square of the deviations in the surface profile, i.e., projections and pits (peaks and valleys), from the mean surface or plane (i.e., the standard deviation of the profile deviations).

The length scale (sampling length) is the field of measurement used by the instrument for a roughness calculation, generally expressed as a unit of length, e.g., micron (micrometer). The length scale is important because features larger than the length scale of the measurement are not fully traversed and thus may not be completely captured in the resulting roughness measurement. Similarly, increasing the length scale can make the measurement more sensitive to curvature of the sample that is not related to the surface texture of interest. The surface roughness of the exterior surface defined by the property ΔRMS as determined by these methods is at least 1 micron measured over a 250 to 1000 micron length scale, especially is at least 1 micron when measured over a 250 to 750 micron scale, and most especially is at least 5 micron when measured over a 700 to 750 micron scale. That is for example, an ΔRMS of at least 1 micron measured over a 250 to 1000 micron length scale represents a 1 micron average of the square of the deviations in the surface profile from the mean surface or plane, in a field of 250 to 1000 microns that is measured by the instrument. The exterior surface defines a plane containing a plurality of projections and a plurality of pits from the plane. The projections have a height, typically expressed as a positive number, from the plane. The pits have a height (or depth), typically expressed as a negative number, from the plane. The exterior surface of the base member is characterized by an average height that represents projections from the plane, wherein on average, the plurality of projections may have an equal or greater height than the depth of the plurality of pits, and/or the projections may be an equal or greater number relative to the number of pits.

White Light Interferometry

The technique used to measure surface roughness of nanofiber webs that would useful in this invention employs scanning white-light interferometry to generate a three-dimensional interferogram of a surface. Interference fringes result from an optical path difference between an internal reference mirror and the sample surface. Fourier analyses are used to convert the interferograms to height at each pixel. Surface roughness, shape, step height etc. are calculated directly from the resulting 3-D image.

The exterior surface roughness of the nanofiber web samples were measured with an optical interferometer sold under the name Zygo NewView 5000 equipped with a variety of different size scales. Data analysis was conducted using Zygo MetroPro Analysis Software version 7.9.0. Equipment and software were manufactured by Zygo Corporation, Middlefield, Conn. Samples were measured at a variety of different size scales from 70 micrometers to 1 cm. The size scale, or length of scale, is the field of measurement (sampling length) used by the Zygo instrument for a particular roughness calculation. From these results, a root mean square (RMS) surface roughness was obtained from image statistics for several length scales.

Water-Vapor-Permeable Air-impermeable Coatings

The invention is directed to a multi-layer composite material wherein a thin coating of a polymer is formed on a nanoweb.

The coating should be a monolithic, air-impermeable, water vapor permeable, very thin layer of a strongly hydrophilic polymer. The coating may also be referred to as a water transport layer. Non-limiting examples include polyurethanes produced from polyether polyamide block copolymers, such as Pebax® available from Arkema, Inc.; polyester elastomers such as Hytrel®, available from E.I. du Pont de Nemours and Company, Wilmington, Del. (DuPont); and polyether urethanes produced from Hypol® marketed by W. R. Grace and Co. Hypol® 2000™ and Hypol® FHP 3000™ are isocyanate terminated polyether polymers, which can be reacted with polyethylene glycol to form a cross-linked polyurethane coating after curing. A choice of chemically-related materials (e.g. both amide-based, both polyester-based) in both the nanoweb and the coating may be done to aid adhesion or durability or for compatibility with article fabrics used in recycling programs.

The coating materials would actually be water vapor permeable through solid state diffusion. The thinner hydrophilic coating is highly beneficial because it increases the moisture vapor transmission rate (MVTR). The nanofiber sheet allows for the deposition of a thinner layer of the hydrophilic polymer than would be possible if a monolithic water-transport film were used or a coating made onto a conventional woven or other fabric layer were used. The finer and smoother structure of the nanofiber web surface permits an overall thinner coating thickness with uniform coverage. In contrast, the large peaks and valleys of fibers in conventional fabrics (regions of weave crimp in woven materials, courses and wales of knits, etc.) require thick polymer coating deposition to fill valleys.

The polymer coating may be applied by various methods, such as gravure coating, roll coating, brush coating and spraying (conventional and airless). Gravure coating is believed to be particularly suitable for applying a very thin coating.

Not intending to be held to any particular theory, we believe that the smooth surface of a nanofiber sheet (opposite the relatively rough structure of a typical textile) along with the high surface area and chemical reactivity of the nanofiber material may create better adherence of the coating. By using as thin a coating layer of polymer as possible, the windproof and/or waterproof traits can be retained while increasing the breathability of the fabric structure. Although existing coatings permit moisture to move through their structure, they do so at a rate that is not considered as desirable in the industry and is related to the thickness of the coating. The nanofiber sheet by itself has a very high degree of moisture vapor transmission, thereby giving a more comfortable feel to a person wearing apparel made from the fabric structure. By using a very thin layer of liquid-penetration-resistant water-vapor-permeable coating, user comfort is retained, while achieving liquid-penetration resistance (hydrohead).

Multilayer Composite

The water vapor permeable layer and nanoweb can be optionally bonded to each other, such as by solvent bonding, adhesive bonding, thermal bonding, and ultrasonic bonding, although any means for bonding known to one skilled in the art may be employed. In a preferred embodiment, the water vapor permeable layer is bonded to the nanoweb, for example, using a suitable lamination technique, such as passing the materials through a hot roll nip at a temperature sufficient to melt adhesive that has been applied to either the water vapor permeable layer or to the nanoweb. One of the rolls can have a raised pattern on its surface in order to produce a bonding pattern in the laminate.

The laminate of nanoweb and water vapor permeable layer can be located in a garment adjacent to an outer fabric layer and an optional inner fabric layer. A wide variety of natural and synthetic fabrics are known and may be used as the fabric layer or layers in the present invention, for example, for constructing sportswear, rugged outerwear and outdoor gear, protective clothing, etc. (for example, gloves, aprons, chaps, pants, boots, gators, shirts, jackets, coats, socks, shoes, undergarments, vests, waders, hats, gauntlets, etc.) as well as non-garment articles such as sleeping bags, tents, luggage, sailcloth and rope storage lockers, carpeting, furniture, car-seats, etc.). Typically, vestments designed for use as rugged outerwear have been constructed of relatively loosely-woven fabrics made from natural and/or synthetic fibers having a relatively low strength or tenacity (for example, nylon, cotton, polyesters, polyacrylics, polypropylene, etc.), with each fiber having a tensile strength or tenacity of less than about 8 grams g/denier (gpd), more typically less than about 5 gpd, and in some cases below about 3 gpd. Such materials can have a variety of beneficial properties, for example, dyeability, breathability, lightness, comfort, and in some instances, abrasion-resistance.

Different weaving structures and different weaving densities may be used to provide several alternative woven composite fabrics as a component of the invention. Woven structures such as plain woven structures, reinforced plain woven structures (with double or multiple warps and/or wefts), twill woven structures, reinforced twill woven structures (with double or multiple warps and/or wefts), satin woven structures, reinforced satin woven structures (with double or multiple warps and/or wefts) may be used. Stretch woven fabrics, ripstops, dobby weaves, and jacquard weaves, as well as knits or felts are also suitable for use in the present invention.

The nanoweb/water transport laminate may be bonded to the fabric layers over some fraction of its surface and can be bonded to the fabric layers by any means known to one skilled in the art, for example adhesively, thermally, using an ultrasonic field, stitching or by solvent bonding.

One or more adhesives may optionally be used to bond the nanoweb and the water transport layer individually, or the nanoweb/water transport layer laminate to the inner or outer fabrics. One suitable adhesive is a thermoplastic adhesive, which can be softened upon heating, then hardened upon cooling over a number of heating and cooling cycles. An example of such a thermoplastic adhesive would be a "hot melt" adhesive. In one embodiment the nanoweb is bonded adhesively using a solution of a polymeric adhesive such as a polyurethane, and allowing the solvent to evaporate. In a further embodiment, when the nanoweb is electrospun directly onto a fabric, the solvent in which the nanoweb is spun is used to achieve solvent bonding.

The adhesive used to laminate the porous water transport layer to the inner or outer fabric layers can also be one of a variety of fluorochemical dispersions or synthetic latexes, including aqueous anionic dispersions of butadiene acrylonitrile copolymers, copolymers based on acrylic esters, vinyl and vinylidene chloride polymers and copolymers produced by emulsion polymerization, styrene-butadiene copolymers, and terpolymers of butadiene, styrene, and vinyl pyridine.

In one embodiment of the invention a spacer scrim can be inserted between the water transport layer and the outer fabric layer and is optionally bonded to either or both the water transport layer and the outer fabric layer. A "scrim" is a support layer and can be any planar structure with which the nanoweb can be bonded, adhered, or laminated. Advantageously, the scrim layers useful in the present invention are spunbond nonwoven layers, but can be made from carded webs of nonwoven fibers and the like.

In one embodiment, the inventive fabric structure has a multilayer construction. A top layer can be made of a material that includes, but is not limited to, nylon mesh, nylon tricot, nylon rip-stop, or fleece. This top layer can be attached adjacent to the thin polymer layer of the composite fabric structure. Optionally, a bottom layer can be attached to the nonwoven nanofiber sheet. The bottom layer can be made of a knit material that can be, but is not limited to, nylon mesh, nylon tricot, nylon rip-stop, or fleece.

Test Methods

Breathability

Breathability can be described as the Moisture Vapor Transmission Rate (MVTR) and is tested under ASTM E96 B. This is the property that allows water vapor to permeate through a compact film. MVTR is measured in $g/m^2/24$ hr. Where g=grams water, m=meter, and hr=hour. The MVTR is calculated by measuring how many grams of water (in vapor form) pass through one square meter of film in 24 hours.

EXAMPLES

This invention will now be illustrated by the following examples.

Example 1

A porous nanofiber web of nylon fibers having a diameter of less than 1000 nanometers and a basis weight of 30 grams per square meter ($30\ g/m^2$) and a surface roughness (RMS) of approximately 10 micrometers is spun onto a PET scrim of basis weight $20\ g/m^2$. Next, a water-vapor-permeable polyurethane coating is applied by a roll coater at a solid component application weight of $5\ g/m^2$ to the nylon surface of the porous nanofiber web. The water-vapor-permeable polyurethane coating is prepared from Hypol 2000™, available from W. R. Grace, a hydrophilic polyurethane prepolymer and polyethylene glycol. The hydrophilic coating is heat treated at 160° C. for 5 minutes for curing.

Example 2

A porous nanofiber web of nylon fibers having a diameter of less than 1000 nanometers and a basis weight of 10 grams per square meter ($10\ g/m^2$) and a surface roughness (RMS) of approximately 10 micrometers is spun onto a nylon scrim of basis weight $20\ g/m^2$. Next, a water-vapor-permeable polyurethane coating is applied by a roll coater at a solid component application weight of $2.5\ g/m^2$ to the nylon surface of the porous nanofiber web. The water-vapor-permeable polyurethane coating is prepared from Hypol 2000™, available from W. R. Grace, a hydrophilic polyurethane prepolymer and polyethylene glycol. The hydrophilic coating is heat treated at 160° C. for 5 minutes to cure the resin.

Example 3

A porous nanofiber web of nylon fibers having a diameter of less than 1000 nanometers and a basis weight of 10 grams per square meter ($10\ g/m^2$) and a surface roughness (RMS) of approximately 10 micrometers nanometers is spun onto a nylon scrim of basis weight $20\ g/m^2$. Next, a water-vapor-permeable polyurethane coating is applied by a roll coater at a solid component application weight of $2.5\ g/m^2$ to the nylon surface of the porous nanofiber web. The water-vapor-permeable polyurethane coating is prepared from Hypol 2000™, available from W. R. Grace, a hydrophilic polyurethane prepolymer and polyethylene glycol. The hydrophilic coating is heat treated at 160° C. for 5 minutes for curing.

Example 4

A 0.0025" film of Hypol FHP3000) prepolymer, available from W. R. Grace is cast on a porous nanofiber web of nylon fibers having a diameter of less than 1000 nanometers and a basis weight of 10 grams per square meter (10 g/m$^2$) and a surface roughness (RMS) of approximately 10 micrometers. The Hypol® polymer is then uniformly sprayed with water. The sample is then placed in a humidity chamber at least 95% relative humidity for 30 minutes to completely cure the film.

Example 5

A 0.005 inch thick sheet of Nafion 120® perfluorosulphonic ion exchange material, sold by Dupont, is laid over a porous nanofiber web of nylon fibers having a diameter of less than 1000 nanometers and a basis weight of 10 grams per square meter (10 g/m$^2$) and a surface roughness (RMS) of approximately 10 micrometers. The sheets are bonded together by mechanical stitching.

What is claimed is:

1. A liquid-penetration-resistant water-vapor-permeable multi-layer composite material consisting of;
a porous nanofiber web of polymeric fibers, wherein the polymeric fibers of the nanofiber web have a diameter of less than 1000 nanometers and wherein the nanofiber web has a basis weight of 5 to 40 grams per square meter and a surface roughness (ΔRMS) of 1 to 15 micrometers, wherein, the porous nanofiber web has an upper surface and a lower surface, and a water-vapor-permeable, hydrophilic, monolithic, water transport layer, and wherein, said porous nanofiber web is coated on said upper surface with a 5 to 15 micrometers layer of said water-vapor-permeable, hydrophilic, monolithic, water transport layer.

2. The liquid-penetration-resistant water-vapor-permeable multi-layer composite material according to claim 1, wherein said composite material has a hydrostatic head of at least 3 meters and a moisture vapor transmission rating (MVTR) of at least 500 g/m$^2$/24 hours per test method ASTM E-96B.

3. The liquid-penetration-resistant water-vapor-permeable multi-layer composite material according to claim 1, wherein said nanofiber web has a basis weight of 10-20 grams per square meter.

4. The nanofiber web according to claim 1, wherein said nanofiber web is composed of nylon.

5. The liquid-penetration-resistant water-vapor-permeable multi-layer composite material of claim 1, characterized in that both the nanofiber web and the water-vapor-permeable, hydrophilic, monolithic water transport layer are composed of nylon.

6. The liquid-penetration-resistant water-vapor-permeable multi-layer composite material of claim 1, where the composite material has a hydrostatic head of at least 10 meters.

7. The liquid-penetration-resistant water-vapor-permeable multi-layer composite material of claim 1, wherein said composite material has a moisture vapor transmission rating (MTRV) is greater than or equal to 750 g/m$^2$/24 hours.

8. The liquid-penetration-resistant water-vapor-permeable multi-layer composite material of claim 1, characterized in that the water-vapor-permeable, hydrophilic, monolithic, water transport layer is polymerized and bonded to said upper surface of said porous nanofiber web.

9. The liquid-penetration-resistant water-vapor-permeable multi-layer composite material of claim 1, characterized in that the water-vapor-permeable, hydrophilic, monolithic, water transport layer is an air-impermeable, water-vapor-permeable, hydrophilic, polymeric film.

10. The liquid-penetration-resistant water-vapor-permeable multi-layer composite material of claim 1, characterized in that the water-vapor-permeable, hydrophilic, monolithic, water transport layer is an air-impermeable, water-vapor-permeable, hydrophilic, polymer precursor composition.

11. The liquid-penetration-resistant water-vapor-permeable multi-layer composite material according to claim 1, wherein said nanofiber web is coated with said water-vapor-permeable, hydrophilic, monolithic, water transport layer on both said upper and said lower surface.

12. A method of forming a liquid-penetration-resistant water-vapor-permeable multi-layer composite material, comprising the steps of;
forming a layer of porous nanofiber web of polymeric fibers, wherein the polymeric fibers of the nanofiber web have a diameter of less than 1000 nanometers and wherein the nanofiber web has a basis weight of 5 to 40 grams per square meter and, where the porous nanofiber web has a surface roughness (ΔRMS) of 5 to 15 micrometers, and where said porous nanofiber web has an upper surface and a lower surface, and forming a water-vapor-permeable, hydrophilic, monolithic, water transport layer, and applying said water-vapor-permeable, hydrophilic, monolithic, water transport layer to the upper surface of said nanofiber web.

13. The method of claim 12, wherein said composite material has a hydrostatic head of at least 3 meters and a moisture vapor transmission rating (MVTR) of at least 500 g/m$^2$/24 hours per test method ASTM E-96B.

14. The method of claim 12, wherein the water transport layer is polymerized and cured to said upper surface of the porous nanofiber web.

15. The method of claim 12, wherein said water transport layer is a polyisocyanate functional urethane polymer.

16. A flexible layered article, comprising;
a porous nanofiber web of polymeric fibers, wherein the polymeric fibers of the nanofiber web have a diameter of less than 1000 nanometers and wherein the nanofiber web has a basis weight of 5 to 40 grams per square meter and a surface roughness (RMS) of 5 to 15 micrometers, and wherein, the porous nanofiber web has an upper surface and a lower surface, and a water-vapor-permeable, hydrophilic, monolithic, water transport layer, and wherein, said porous nanofiber web is coated on a portion of said upper surface with a 5 to 15 micrometers layer of said water-vapor-permeable, hydrophilic, monolithic, water transport layer.

17. The flexible layered article according to claim 16, wherein said flexible layered article is selected from the group consisting of coats, ponchos, shirts, blouses, vests, sweaters, undergarments, sweatshirts, jackets, coats, scarves, head bands, ear muffs, ear and/or neck warmers, handkerchiefs, hats, caps, gloves, neckties, masks, mufflers, dresses, socks, pants, purses, tents, tarpaulins, ground cloths, sleeping bags, sleeping bag covers, luggage, sail-cloth and rope storage lockers, carpeting, furniture, car-seats, backpacks and coveralls.

* * * * *